United States Patent
Lim et al.

(10) Patent No.: US 10,267,699 B2
(45) Date of Patent: Apr. 23, 2019

(54) PRESSURE SENSOR ELEMENT AND METHOD OF MANUFACTURING THE SAME

(71) Applicant: Samsung Electro-Mechanics Co., Ltd., Suwon-si (KR)

(72) Inventors: Chang Hyun Lim, Suwon-si (KR); Dae Hun Jeong, Suwon-si (KR); Tae Hun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 151 days.

(21) Appl. No.: 15/045,684

(22) Filed: Feb. 17, 2016

(65) Prior Publication Data
US 2017/0003187 A1    Jan. 5, 2017

(30) Foreign Application Priority Data

Jun. 30, 2015  (KR) .......................... 10-2015-0092908

(51) Int. Cl.
*G01L 9/00*       (2006.01)

(52) U.S. Cl.
CPC .......... *G01L 9/0054* (2013.01); *G01L 9/0047* (2013.01)

(58) Field of Classification Search
None
See application file for complete search history.

(56) References Cited

U.S. PATENT DOCUMENTS

| | | | | |
|---|---|---|---|---|
| 5,116,331 A * | 5/1992 | Chapman | ............... | G01L 9/0054 338/4 |
| 5,499,158 A * | 3/1996 | Bishop | .................. | G01L 9/0075 361/283.4 |
| 6,440,642 B1 * | 8/2002 | Shelnut | .................... | G03F 7/038 428/411.1 |
| 6,928,879 B2 * | 8/2005 | Partridge | ............ | B81C 1/00047 361/283.1 |
| 7,490,519 B2 * | 2/2009 | Subramanian | ........ | G01L 9/0019 73/702 |
| 7,553,071 B2 | 6/2009 | Legl et al. | | |
| 8,381,596 B2 * | 2/2013 | Doering | ................ | G01L 9/0054 73/721 |
| 8,490,495 B2 * | 7/2013 | Lee | ...................... | G01L 19/0092 73/715 |
| 8,881,596 B2 * | 11/2014 | Chiou | ..................... | G01L 19/04 361/283.4 |
| 8,884,385 B2 * | 11/2014 | Nishikawa | ............... | H01L 29/84 257/415 |
| 2011/0271772 A1 | 11/2011 | Parks et al. | | |
| 2013/0259964 A1 * | 10/2013 | Gamage | ............... | A61B 5/6852 425/170 |
| 2014/0217521 A1 * | 8/2014 | Johari-Galle | ....... | B81C 1/00134 257/415 |

* cited by examiner

*Primary Examiner* — Peter Macchiarolo
*Assistant Examiner* — Jermaine Jenkins
(74) *Attorney, Agent, or Firm* — NSIP Law (57) ABSTRACT

A pressure sensor element includes a die; a cavity and a trench formed in one surface of the die and defining therebetween a partition wall integral with and formed of the same material as the die; and a membrane formed on the die and covering the cavity and the trench.

24 Claims, 8 Drawing Sheets

PRESSURE SENSOR ELEMENT AND METHOD OF MANUFACTURING THE SAME

CROSS-REFERENCE TO RELATED APPLICATION(S)

This application claims the benefit of Korean Patent Application No. 10-2015-0092908 filed on Jun. 30, 2015 in the Korean Intellectual Property Office, the entire disclosure of which is incorporated herein by reference for all purposes.

BACKGROUND

1. Field

The following description relates to a pressure sensor element and a method of manufacturing the same.

2. Description of Related Art

In accordance with continuous miniaturization of electronic products, components mounted in electronic products have been gradually miniaturized. Therefore, a micro sensor manufactured using a micro electro mechanical system (MEMS) technology has been preferred as a sensor widely used in compact electronic products, or the like.

For example, as a pressure sensor among various micro sensors, a piezoresistive type pressure sensor which can sense stress generated when a membrane covering a cavity of a die is deformed by pressure has been used.

In order to implement a high-precision pressure sensor, the membrane should only be deformed by pressure, and should not be deformed by other factors. One factor decreasing precision of a pressure sensor is stress generated when deformation occurring at an outer portion such as a package is directly transferred to the membrane through the die.

Therefore, even though relatively minor deformations are generated, the sensing characteristics may be substantially affected, and thus the precision of the sensor is decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a pressure sensor element includes a die; a concave groove formed in one surface of the die; a partition wall formed in the concave groove to be spaced apart from side walls, the partition wall partitioning the concave groove into a trench and a cavity; and a membrane formed on the die and covering the concave groove.

The trench may be disposed to enclose the cavity.

The membrane may include a sensing membrane part formed in a region corresponding to the cavity and an external force blocking membrane part formed in a region corresponding to the trench, in relation to a region at which the membrane meets the partition wall.

A pressure sensing part may be formed on the membrane, and the pressure sensing part may be disposed on the sensing membrane part.

A wiring pattern may be formed on the die and the membrane, and the wiring pattern may be electrically connected to the pressure sensing part.

The membrane may be fixed integrally with an upper surface of the partition wall.

According to another general aspect, a method of manufacturing a pressure sensor element includes forming a trench and a cavity in a die; and forming a membrane to cover the trench and the cavity.

The forming of the trench and the cavity in the die may include etching the die using a mask on which a slit pattern corresponding to the trench and the cavity is formed.

The forming of the membrane may include bonding a substrate for a membrane to the die in which the trench and the cavity are formed; and polishing the substrate for a membrane to form the membrane having a predetermined thickness.

The forming of the trench and the cavity in the die may include n-doping a lattice shaped region corresponding to the trench and a lattice shaped region corresponding to the cavity on a surface of the die; porous-etching the die below the n-doped lattice shaped regions; and forming hollows in the die below the n-doped lattice shaped regions.

The forming of the membrane may include growing an epitaxial layer on the n-doped lattice shaped regions to form the membrane.

The hollows may be formed through chemical treatment or through heat treatment.

According to another general aspect, a method of manufacturing a pressure sensor element includes forming a plurality of columns by etching a die using a mask in which a lattice shaped region corresponding to a trench and a lattice shaped region corresponding to a cavity are formed; growing an epitaxial layer on the plurality of columns in order to form a membrane; and forming hollows in the die below the lattice shaped regions.

The forming of the hollows may include heat-treating the die.

According to another general aspect, a pressure sensor apparatus includes a substrate; a die coupled to at least a portion of the substrate with a planar cavity formed in the die; at least one force attenuating region disposed around a peripheral portion of the planar cavity; and, a flexible membrane disposed over the planar cavity including at least one deformable sensor disposed on the flexible membrane configured to measure a pressure applied to the membrane.

The deformable sensor may include a piezoresistor.

The deformable sensor may include a plurality of piezoresistors coupled in a voltage divider circuit.

The deformable sensor may include a plurality of piezoresistors coupled in a Wheatstone circuit.

The die may be configured to be deformable and the force attenuating region may include a trench and a partition wall encircling the planar cavity.

The deformable die may be coupled to the substrate with an adhesive layer adaptively formed to isolate deformations of the substrate from the die.

Other features and aspects will be apparent from the following detailed description, the drawings, and the claims.

BRIEF DESCRIPTION OF THE DRAWINGS

The above and other aspects, features, and advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Figure 1:
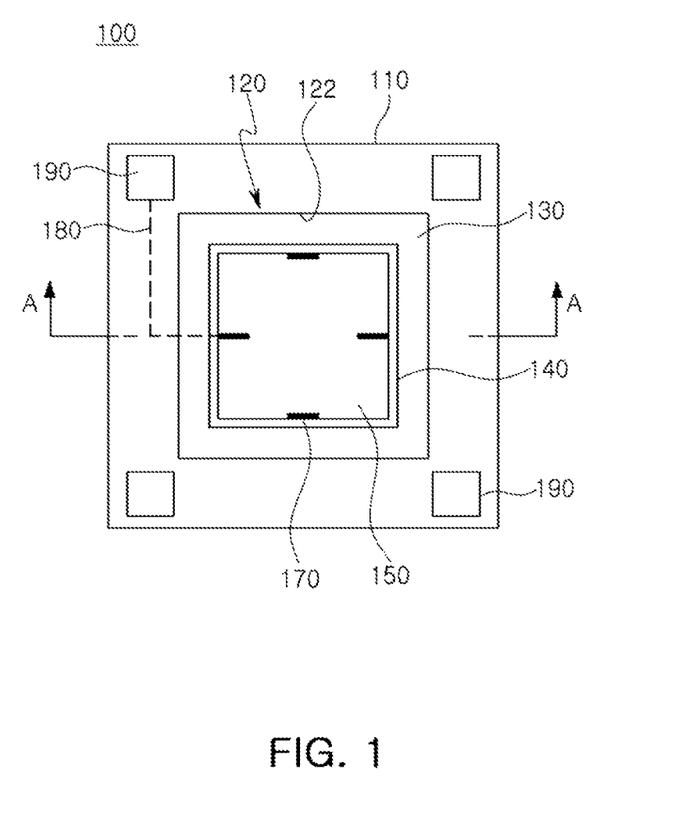
FIG. 1 is a plan view illustrating a pressure sensor element according to an exemplary embodiment.
Figure 2:
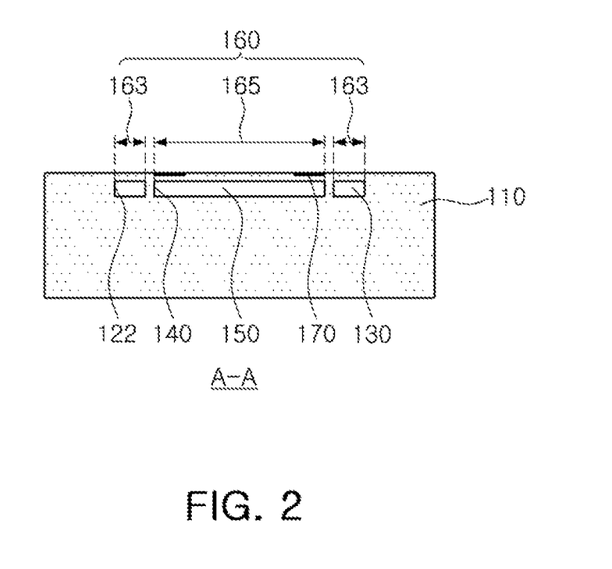
FIG. 2 is a cross-sectional view taken along line A-A of FIG. 1.
Figure 3:
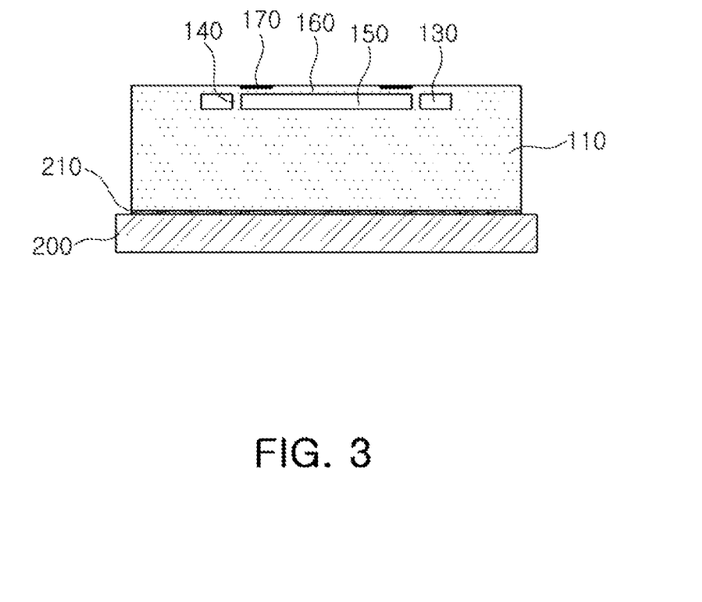
FIG. 3 is a cross-sectional view illustrating a state in which a pressure sensor element according to an exemplary embodiment is fixed to a substrate.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art. FIG. 1 is a plan view illustrating a pressure sensor element according to an exemplary embodiment; FIG. 2 is a cross-sectional view taken along line A-A of FIG. 1, and FIG. 3 is a cross-sectional view illustrating a state in which the pressure sensor element according to an exemplary embodiment is fixed to a substrate.

Figure 4:
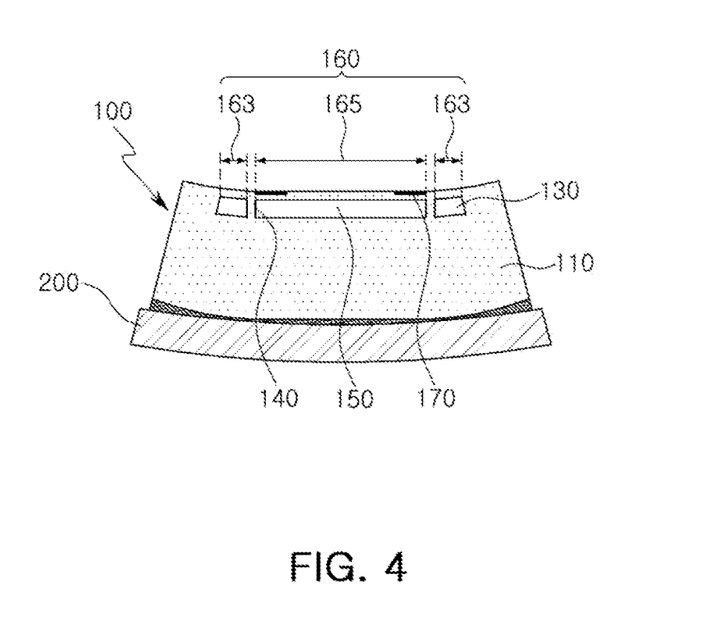
FIG. 4 is a cross-sectional view illustrating a state in which a pressure sensor element according to an exemplary embodiment is deformed.
Figure 5:
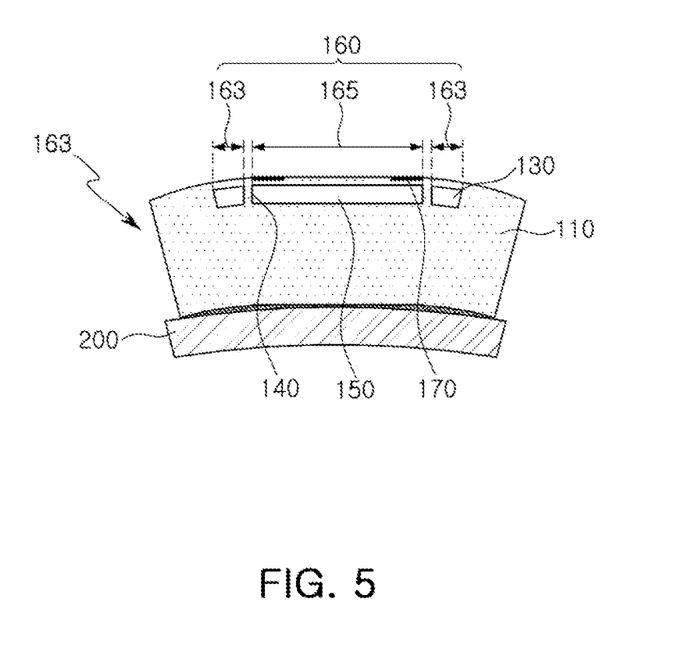
FIG. 5 is a cross-sectional view illustrating another state in which the pressure sensor element according to an exemplary embodiment may be deformed.

In addition, FIGS. 4 and 5 are cross-sectional views illustrating states in which the pressure sensor element according to an exemplary embodiment is deformed.

As illustrated in FIGS. 1 through 5, a pressure sensor element 100, according to an exemplary embodiment, includes a die 110; a concave groove 120 formed in one surface of the die 110; a partition wall 140 formed in the concave groove to be spaced apart from side walls 122 and partitioning a trench 130 and a cavity 150; and a membrane 160 formed on the die and covering the concave groove.

The die 110, which is a semiconductor substrate, may be a general silicon substrate.

For example, the die 110 may be formed of single crystal silicon or a silicon-on-insulator (SOI).

In addition, the die 110 may have a form in which one or more silicon layers are stacked.

The concave groove 120 may be formed in an upper surface of the die 110.

In addition, a concave part (not illustrated) having a predetermined volume may also be formed in a lower surface of the die 110, if necessary.

The partition wall 140 may be formed in the concave groove 120 to be spaced apart from the side walls 122 by a predetermined interval. Therefore, the partition wall 140 may be disposed to be accommodated in the concave groove of the die 110.

The trench 130 may be provided between the die 110 and the partition wall 140 so that the die 110 and the partition wall 140 are disposed to be spaced apart from each other within the concave groove 120.

For example, as illustrated in FIG. 1, when the concave groove 120 has a shape with an approximately quadrangular cross section, the partition wall 140 may also have a shape with a quadrangular cross section of which an inner portion is empty.

Therefore, outer surfaces of the partition wall 140 and inner surfaces of the concave groove 120 may be disposed to correspond to and face each other.

However, the partition wall 140 and the concave groove 120 are not limited to having the above-mentioned shape and disposition.

The cavity 150 may be partitioned in the partition wall 140. Therefore, the trench 130 may be disposed to enclose the cavity in the partition wall.

As illustrated in FIG. 3, a lower end of the die 110 may be fixed to a substrate 200, and in a case in which the concave part is formed in the lower surface of the die as described above, a space (not illustrated) may be provided between the die and the substrate.

Here, a material of the substrate 200 may be glass, but is not limited thereto. That is, various substrates such as a silicon substrate may be used, if necessary.

The pressure sensor element 100 according to an exemplary embodiment includes the membrane 160 formed on the die 110 and covering the concave groove 120, and at least one pressure sensing part 170 may be disposed on an upper surface of the membrane.

The membrane 160 may have a form of a thin membrane, and may cover the concave groove 120, that is, the trench 130, the partition wall 140, and the cavity 150 on the upper surface of the die 110 to seal the concave groove.

Therefore, an internal space possessed by the concave groove 120 of the die 110 may be sealed by the membrane 160.

Here, since the membrane 160 is fixed integrally with an upper surface of the partition wall 140, the trench 130 and the cavity 150 may form separate sealed spaces, respectively, by the membrane.

The membrane 160 may be formed of a polysilicon layer or a silicon oxide layer, or may be formed by stacking the polysilicon layer and the silicon oxide layer, but is not limited thereto.

For example, the membrane 160 may also be formed of the same material as that of the die 110.

The membrane 160 may include a sensing membrane part 165 formed in an inner region thereof, that is, a region of the membrane corresponding to the cavity 150, and an external force blocking membrane part 163 formed in an outer region thereof, that is, a region of the membrane corresponding to the trench 130, in relation to a region at which the membrane 160 and the partition wall 140 meet each other.

The pressure sensing part 170 may be formed on the upper surface of the membrane. In more detail, the pressure sensing part 170 may be disposed on the sensing membrane part 165.

The pressure sensing part 170 may include, for example, a plurality of piezo-resistors (or piezoresistive elements), or other suitable sensor.

When the membrane 160, particularly, the sensing membrane part 165 is deformed by external force, stress of the membrane may be concentrated on the pressure sensing part 170, and thus a resistance value of the piezo-resistor is changed, thereby sensing and measuring pressure.

For example, as illustrated in FIG. 1, in the pressure sensor element 100 according to an exemplary embodiment, a Wheatstone bridge circuit may be configured through four pressure sensing parts 170.

Therefore, in a case in which deformation is not generated in the membrane 160, output voltages of the four pressure sensing parts 170 may be 0V.

Conversely, in a case in which deformation is generated in the membrane 160 due to a change in the surrounding pressure, a resistance value of at least one of the four pressure sensing parts 170 may be changed, and thus a value that is not 0V is output as an output voltage.

The change in pressure may be measured as described above.

Meanwhile, in a case in which deformation such as bending is generated in the substrate 200, the die 110 fixed to the substrate may also be deformed together with the substrate.

In this case, in a pressure sensor according to the related art, the membrane is also affected by this deformation, and thus a resistance value of the pressure sensing part of the membrane is changed, whereby an output voltage of the pressure sensor is also changed.

When the output voltage of the pressure sensing part is changed due to the deformation as described above, it is difficult to distinguish a case in which the output voltage of the pressure sensing part is changed due to deformation from a case in which the output voltage is changed due to a change in actual pressure.

Particularly, in a case in which the deformation and the change in pressure are simultaneously generated, since the output voltage depending on the change in pressure is not output singularly, but is output together with the output voltage depending on the deformation, precision of measurement of the change in pressure may be decreased.

Therefore, in the pressure sensor element 100 according to an exemplary embodiment, the partition wall 140 and the trench 130 may be formed in the concave groove 120 of the die 110 to limit the deformation of the die 110 and block impact or external force from being transferred to the sensing membrane part 165, whereby the above-mentioned problem may be solved.

Impact or external force may be applied to the pressure sensor element 100 according to an exemplary embodiment, and thus force having a significant magnitude may act on the pressure sensor element from one side or both sides of the die 110, as illustrated in FIGS. 4 and 5.

This force may cause deformation of the sensing membrane part 165, as well as the die 110.

In particular, since the pressure sensor element is a component sensitive to external impact, this force may decrease reliability of measurement of the pressure sensor element.

However, in the pressure sensor element 100 according to an exemplary embodiment, the partition wall 140 and the trench 130 may be formed on the die 110, and when impact or external force is applied to the pressure sensor element, a space between the die and the partition wall may be deformed to prevent deformation of the sensing membrane part 165.

In more detail, as illustrated in FIGS. 4 and 5, in a case in which impact is applied to the pressure sensor element 100 by external force, the die 110 may be deformed due to warpage, or the like, but the deformation may be constrained in only a portion at which the trench 130 is formed, and the partition wall 140 may maintain its form in order to prevent deformation of the die.

Further, since the die 110 and the partition wall 140 are spaced apart from each other with the trench 130 interposed therebetween, when the die is deformed, the external force blocking membrane part 163 positioned between the die and the partition wall may be deformed while an interval between the die and the partition wall, that is, the trench may flex to become wider or narrower without deforming the sensing membrane 165.

As described above, a buffering effect may be provided between the die and the partition wall through elastic deformation of the portion at which the trench 130 of the die 110 is formed and the external force blocking membrane part 163. Therefore, a form of the partition wall 140 may be maintained, thereby effectively blocking impact or external force from being transferred from the die so that the sensing membrane part 165 is not deformed by external stress. While only one trench portion 130 has been illustrated for conciseness and clarity, any suitable number may be employed such as two, three, or a further plurality of concentric trenches 130 may be formed.

Additionally, an adhering layer 210 having a predetermined thickness may be formed between the die 110 and the substrate 200, and the deformation may also be focused in the adhering layer 210, thereby assisting in blocking and attenuating external stress before it reaches the sensing membrane 165. As seen in FIG. 4 by employing, for example, a relatively more elastic adhesive, by using relatively less or more adhesive such as by increasing a thickness at peripheral portions, by interposing non-adhered portions, by doping adhesive, or by omitting adhesive toward peripheral portions of the die 110, deformations of the underlying substrate 200 may be prevented from being transmitted to the die 110.

Therefore, reliability of an operation of the pressure sensor element according to an exemplary embodiment may be maintained even in a case in which impact or external force is applied to the pressure sensor element.

A wiring pattern 180 may be formed on surfaces of the die 110, on the membrane 160, or on the die 110 and the membrane 160.

The wiring pattern may electrically connect the pressure sensing parts 170 to electrode pads 190 or the substrate 200 in a serial, parallel, or combined configuration as would be known to one of skill in the art.

The pressure sensor element 100 according to the exemplary embodiment configured as described above may be manufactured through micro electro mechanical system (MEMS) technology.

A method of manufacturing a pressure sensor element according to an exemplary embodiment may include forming the trench 130 and the cavity 150 in the die 110; and forming the membrane 160 to cover the trench 130 and the cavity 150.

Figure 6:
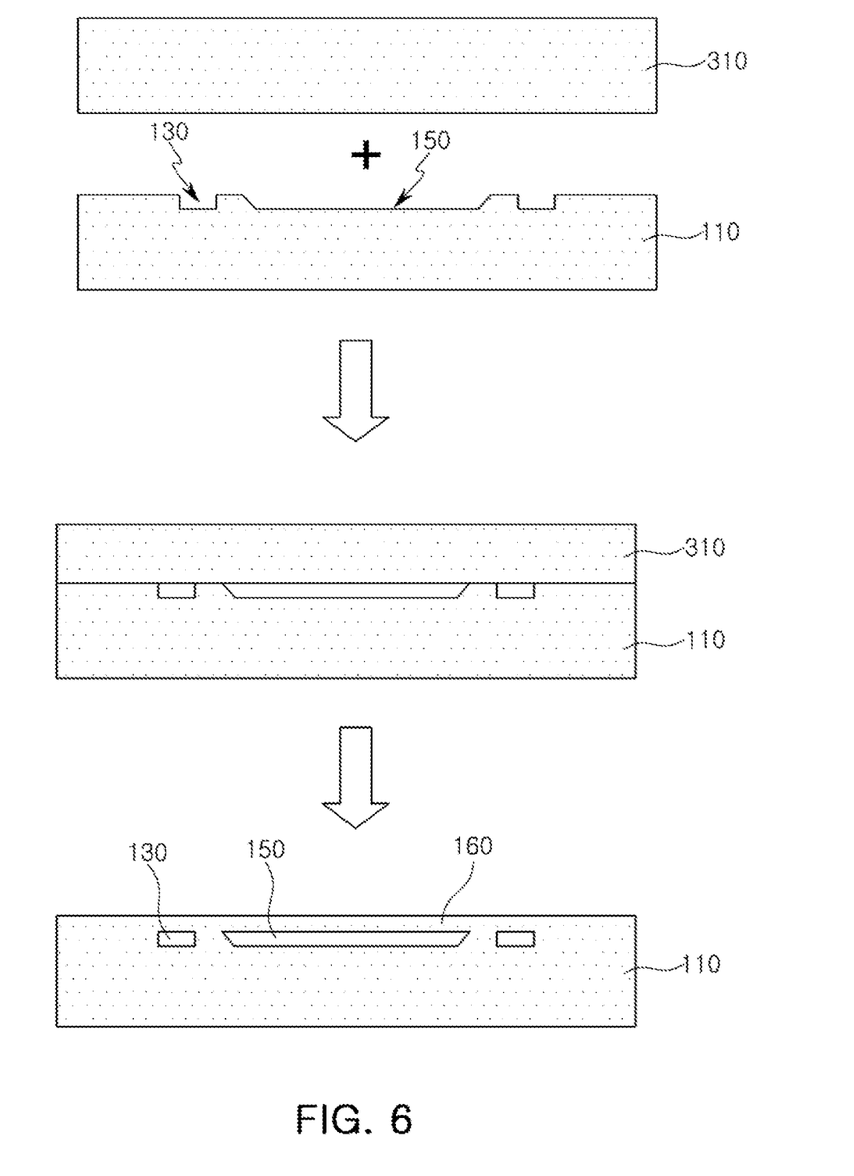
FIG. 6 is a view schematically illustrating a method of manufacturing a pressure sensor element according to an exemplary embodiment.

FIG. 6 is a view schematically illustrating a method of manufacturing a pressure sensor element according to an exemplary embodiment.

As illustrated in FIG. 6, a method of manufacturing a pressure sensor element according to an exemplary embodiment may include etching the die 110 using a mask on which a slit pattern corresponding to the trench 130 and the cavity 150 is formed, and bonding a substrate 310 for a membrane to the die having the trench and the cavity formed therein using, for example, a silicon direct bonding method in order to form the membrane 160.

As an etching method of forming the trench 130 and the cavity 150 having a predetermined depth in the die 110 formed of silicon, there may be several methods. For example, there may be a method of applying a photoresist onto an upper surface of the die, performing exposure and development on the photoresist to pattern a predetermined slit pattern, and then etching the die along the slit pattern using the photoresist as a mask.

Here, the etching may be performed by a dry etching method such as reactive ion etching (RIE) or a wet etching method.

After the etching is performed, the photoresist, that is, the mask, may be removed.

Next, the substrate 310 for a membrane formed of silicon may be prepared, the substrate 310 for a membrane and the etched die 110 may be closely adhered to each other by a predetermined pressure, and the die and the substrate for a membrane in a state in which they are temporarily bonded to each other by close adhesion may be inserted into a heat treatment furnace to thereby be heat-treated at a temperature of approximately 1000° C. or other suitable temperature and pressure combination.

In this case, the die 110 formed of silicon and the substrate 310 for a membrane may be strongly bonded to be formed integrally with each other by mutual diffusion between atoms present in the die 110 and the substrate 310 for a membrane.

Then, the substrate 310 for a membrane may be polished to form the membrane 160 having a predetermined thickness.

The pressure sensing parts including e.g. the piezo-resistor may be formed on the sensing membrane part 165 (see, for example, FIG. 2) of the membrane 160.

The pressure sensing parts 170 may be implemented by depositing a piezoelectric thin film formed of, for example, polysilicon, lead zirconate titante (PZT), or the like, doped with a piezoelectric material, and then patterning the piezoelectric thin film.

Finally, a metal layer for electrically connecting the pressure sensing parts 170 to each other may be deposited on a specific portion to form a wiring pattern, such as a Wheatstone circuit, voltage divider, or other suitable arrangement, and an electrode pad may also be formed together with the metal layer when the metal layer is formed.

As described above, according to an exemplary embodiment, the pressure sensor element may be manufactured by a manufacturing process without having a separately added processes.

Figure 7:
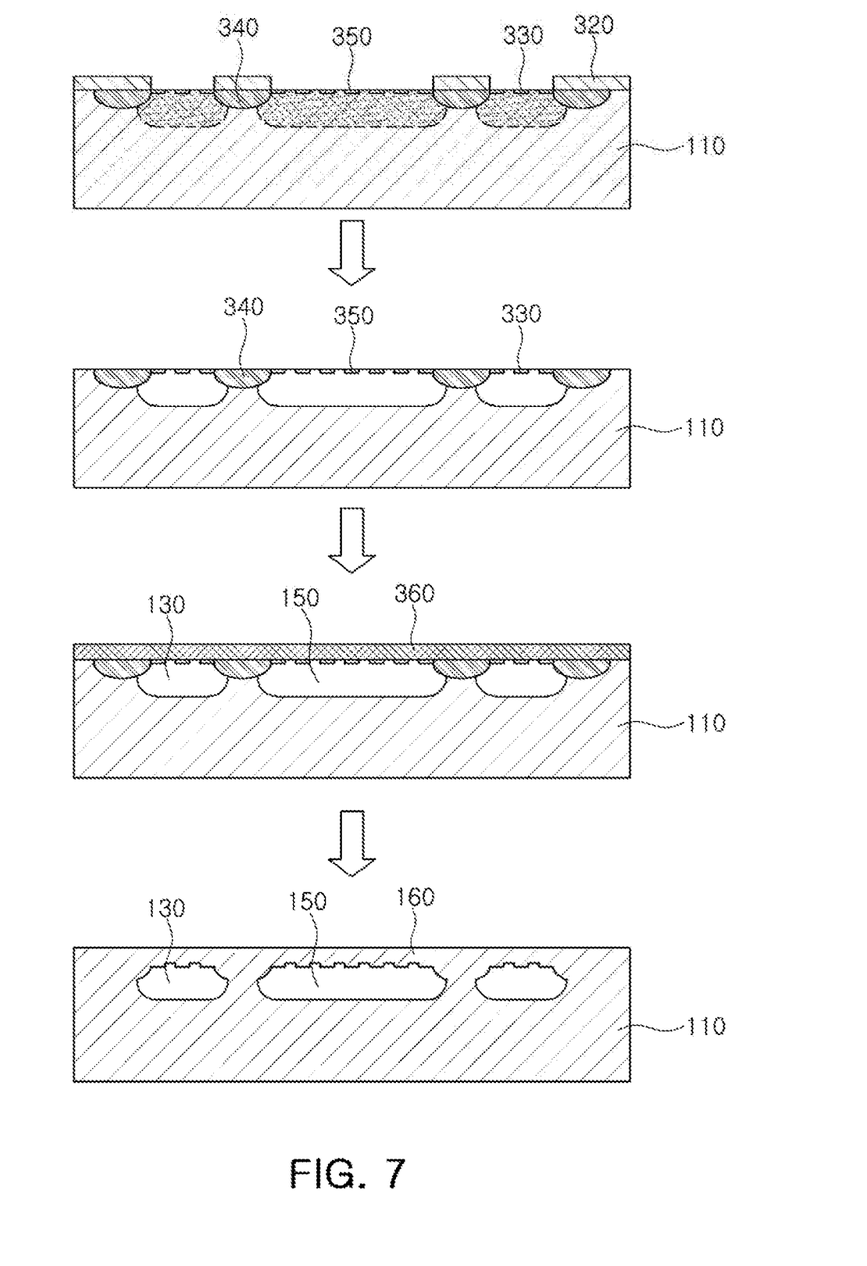
FIG. 7 is a view schematically illustrating a method of manufacturing a pressure sensor element according to another exemplary embodiment.

FIG. 7 is a view schematically illustrating a method of manufacturing a pressure sensor element according to another exemplary embodiment.

As illustrated in FIG. 7, a method of manufacturing a pressure sensor element according to another exemplary embodiment may include n-doping a lattice shaped region 330 corresponding to the trench 130 and a lattice shaped region 350 corresponding to the cavity 150 on a surface of the die 110 formed of p-doped silicon, porous-etching the die below the n-doped lattice shaped regions, forming hollows in the die below the n-doped lattice shaped regions, and growing a single crystal silicon epitaxial layer 360 on the n-doped lattice shaped regions in order to form the membrane 160.

The present exemplary embodiment may be based on the die 110 formed of the p-doped silicon, and the n-doped and continuous lattice shaped regions 330 and 350 may be formed on the die through, for example, an ion implantation method or a diffusion method.

Therefore, n+ doped regions 340 enclosing the n-doped lattice shaped regions 330 and 350 on the surface may be formed inwardly of the die 110.

In this case, a SiN mask 320 setting dimensions of the n-doped lattice shaped regions 330 and 350 in a horizontal direction in the die below the n-doped lattice shaped regions 330 and 350 may be provided on the surface of the die 110.

Next, the silicon of the die below the n-doped lattice shaped regions 330 and 350 may be porous-etched by anodizing the silicon with, for example, concentrated hydrofluoric acid.

In this case, the SiN mask 320 may protect the surface of the die 110 disposed in the surrounding region thereof.

In addition, the n+ doped regions 340 formed in an inward direction may form a blocking part of the porous-etching in the horizontal direction.

The n-doped lattice shaped regions 330 and 350 may not also be etched, and may be used as a start layer for the subsequent epitaxy.

Before the epitaxy, the SiN mask 320 may be removed from the surface of the die 110.

The hollows may be formed in the porous-etched die below the n-doped lattice shaped regions 330 and 350.

In porous silicon, these hollows may be formed through, for example, wet chemical treatment, or may be formed through thermal displacement of the porous silicon in heat treatment such as tempering.

The single crystal silicon epitaxial layer 360 may be grown on the n-doped lattice shaped regions 330 and 350 to form the membrane 160.

A mesh of the n-doped lattice shaped regions 330 and 350 may be covered by the growth, and a thickness of the epitaxial layer 360 may be determined by a size of the mesh of the n-doped lattice shaped regions 330 and 350.

The pressure sensing parts including the piezo-resistor may be formed on the membrane 160 formed as described above, and a metal layer for electrically connecting the pressure sensing parts to each other may be finally deposited on a specific portion to form a wiring pattern.

Figure 8:
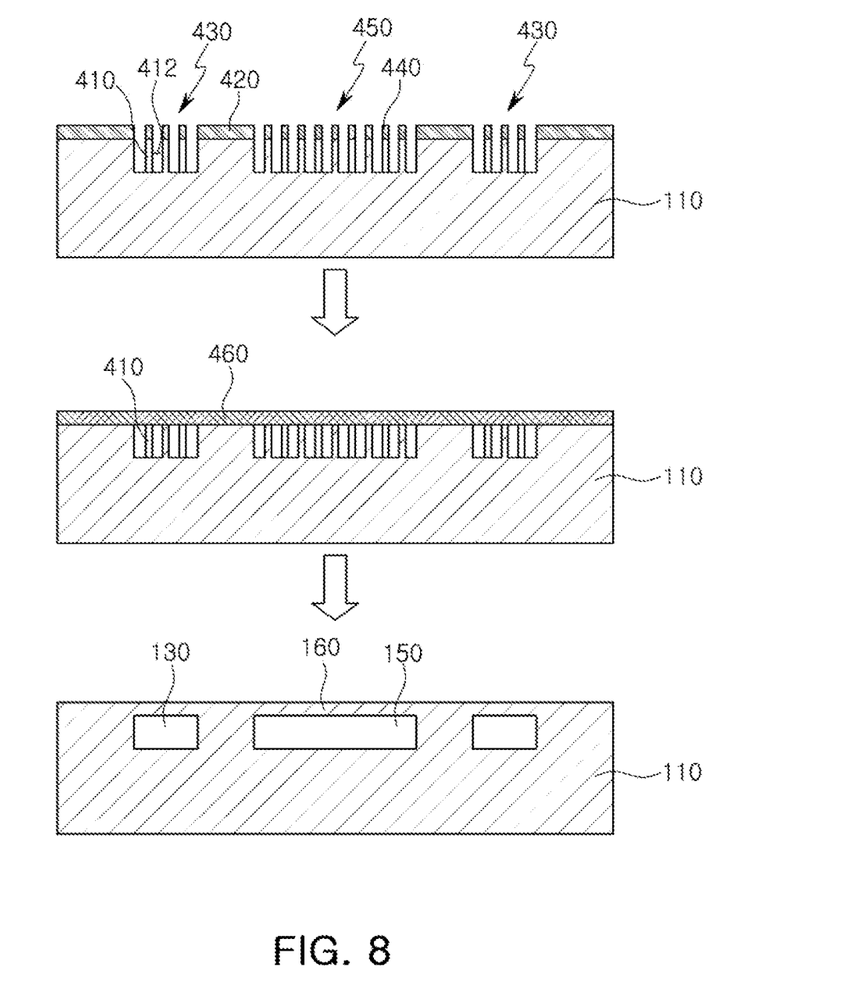
FIG. 8 is a view schematically illustrating a method of manufacturing a pressure sensor element according to another exemplary embodiment.

FIG. 8 is a view schematically illustrating a method of manufacturing a pressure sensor element according to another exemplary embodiment.

As illustrated in FIG. 8, a method of manufacturing a pressure sensor element according to another exemplary embodiment includes forming a plurality of columns 410 by etching the die 110 using a mask 420 in which a lattice shaped region 430 corresponding to the trench 130 and a lattice shaped region 450 corresponding to the cavity 150 are formed, growing an epitaxial layer 460 on the plurality of columns in order to form the membrane 160, and forming hollows in the die below the lattice shaped regions.

A mask may be formed on an upper surface of the die 110 by a photoresist.

The lattice shaped region 430 corresponding to the trench 130 and the lattice shaped region 450 corresponding to the cavity 150 may be formed in the mask 420. The respective lattice shaped regions may include a plurality of mask parts 440 having a hexagonal shape to form, for example, a honeycomb shape.

For example, an interval between the mask parts 440 may be about 1 μm to about 2 μm.

Anisotropic etching may be performed on the die 110 using the mask 420 to form clearance parts 412 having a depth of approximately 10 μm and a width of approximately 1 μm to approximately 2 μm. These clearance parts may be in communication with each other, and thus the plurality of silicon columns 410 may be implemented.

Then, the mask 420 may be removed, and the growing of the epitaxial layer 460 may be performed under a deoxygenation atmosphere.

As a result, the silicon epitaxial layer 460 may be grown on the columns 410 to close opening regions of the clearance parts 412.

Next, heat treatment such as annealing may be performed on the die for a predetermined time at a temperature of approximately 1100° C., and thus movement of silicon atoms that tend to move to a position of relatively low energy is generated.

Therefore, the silicon atoms may completely move from the respective columns by a close distance between the columns 410 to form embedded hollows.

A silicon thin layer partially formed by silicon atoms grown in the epitaxial layer 460 and partially formed by the moving silicon atoms may remain at the top of the hollows to form the membrane 160. This membrane may have flexibility, and may be deformed by external stress.

The pressure sensing parts including the piezo-resistor may be formed on the membrane 160, and a metal layer for electrically connecting the pressure sensing parts to each other may finally be deposited on a specific portion to form a wiring pattern.

As set forth above, according to exemplary embodiments, external stress transferred to a sensing region may be significantly decreased, and electrical connection from the pressure sensing part to the electrode pad may be made, and thus market demand for a high-performance sensor may be satisfied.

In addition, according to exemplary embodiments, the pressure sensor element may be manufactured by a more efficient manufacturing process without adding additional processes, and thus the high-precision pressure sensor element may be ultimately provided without increasing manufacturing costs.

The apparatuses, units, modules, devices, and other components (e.g. sensing part 170) illustrated in FIGS. 1-5 that perform the operations described herein are implemented by and in some instances with hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations and measurements described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The measurements of pressure such as by monitoring indirect characteristics of the sensing membrane 165 such as, e.g. resistance, impedance, capacitance, are performed ultimately by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A pressure sensor element comprising:
a die;
a cavity and a trench formed in one surface of the die and defining therebetween a partition wall configured to buffer an effect of deformation of the trench on the cavity; and
a membrane formed on the die and covering the cavity and the trench,
wherein the membrane includes at least one deformable sensor, overlaying the cavity, configured to measure a pressure applied to the membrane overlaying the cavity.

2. The pressure sensor element of claim 1, wherein the trench and the partition wall encircle the cavity.

3. The pressure sensor element of claim 1, wherein the membrane is fixed integrally with an upper surface of the partition wall.

4. The pressure sensor element of claim 1, wherein the membrane includes a sensing membrane part formed in a region overlying the cavity, and an external force blocking membrane part formed in a region overlying the trench.

5. The pressure sensor element of claim 4,
wherein the at least one deformable sensor is formed on the sensing membrane part, and
wherein a wiring pattern is formed on the die and the membrane, the wiring pattern being electrically connected to the at least one deformable sensor.

6. A pressure sensor element comprising:
a die;
a cavity and a trench formed in one surface of the die and defining therebetween a partition wall; and
a membrane formed on the die and covering the cavity and the trench,
wherein the membrane includes
a sensing membrane part, formed in a region overlying the cavity, configured with one or more pressure sensors to sense force applied to the sensing membrane part, and
an external force blocking membrane part, formed in a region overlying the trench, configured without a pressure sensor.

7. The pressure sensor element of claim 6, wherein the one or more pressures sensors are formed on the sensing membrane part.

8. The pressure sensor element of claim 7, wherein a wiring pattern is formed on the die and the membrane, and
the wiring pattern is electrically connected to the one or more pressure sensors.

9. A method of manufacturing a pressure sensor element, comprising:
forming a trench and a cavity in a die, the trench and the cavity defining therebetween a partition wall configured to buffer an effect of elastic deformation of the trench on the cavity; and
forming a membrane covering the trench and the cavity; and
forming at least one deformable sensor, overlaying the cavity, configured to measure a pressure applied to the membrane covering the cavity.

10. The method of claim 9, wherein the forming of the trench and the cavity in the die includes etching the die using a mask on which a slit pattern corresponding to the trench and the cavity is formed.

11. The method of claim 9, wherein the forming of the membrane includes:
bonding a substrate for a membrane to the die in which the trench and the cavity are formed; and
polishing the substrate for a membrane to form the membrane having a predetermined thickness.

12. The method of claim 9, wherein the trench and the partition wall encircle the cavity.

13. The method of claim 9, wherein the forming of the membrane includes forming a sensing membrane part formed in a region overlying the cavity and an external force blocking membrane part formed in a region overlying the trench.

14. The method of claim 13,
wherein the forming of the at least one deformable sensor includes forming the at least one deformable sensor on the sensing membrane part, and
the method further comprises forming a wiring pattern, on the die and the membrane, electrically connected to the at least one deformable sensor.

15. A method of manufacturing a pressure sensor element, comprising:
forming a trench and a cavity in a die, the trench and the cavity defining therebetween a partition wall; and
forming a membrane covering the trench and the cavity,
wherein the forming of the trench and the cavity in the die includes:
n-doping a lattice shaped region corresponding to the trench and a lattice shaped region corresponding to the cavity on a surface of the die;
porous-etching the die below the n-doped lattice shaped regions; and
forming hollows in the die below the n-doped lattice shaped regions.

16. The method of claim 15, wherein the forming of the membrane includes growing an epitaxial layer on the n-doped lattice shaped regions to form the membrane.

17. The method of claim 15, wherein the hollows are formed through chemical treatment or through heat treatment.

18. A pressure sensor apparatus comprising:
a substrate;

a die coupled to at least a portion of the substrate and having a planar cavity and a trench formed therein, the trench and the cavity defining therebetween a partition wall;

at least one force attenuating region disposed around a peripheral portion of the planar cavity; and, a flexible membrane covering the planar cavity and including at least one deformable sensor disposed on the flexible membrane configured to measure a pressure applied to the membrane.

19. The apparatus of claim 18, wherein the deformable sensor comprises a piezoresistor.

20. The apparatus of claim 19, wherein the deformable sensor comprises a plurality of piezoresistors coupled in a voltage divider circuit.

21. The apparatus of claim 19, wherein the deformable sensor comprises a plurality of piezoresistors coupled in a Wheatstone circuit.

22. The apparatus of claim 21, wherein the force attenuating region comprises the trench and the partition wall, both of which encircle the planar cavity.

23. The apparatus of claim 22, wherein the deformable die is coupled to the substrate with an adhesive layer adaptively formed to isolate deformations of the substrate from the die.

24. The apparatus of claim 18, wherein the flexible membrane also covers the trench.

* * * * *